United States Patent
Shinohara et al.

(10) Patent No.: US 9,772,619 B2
(45) Date of Patent: Sep. 26, 2017

(54) MOTOR CONTROL DEVICE

(71) Applicant: Mitsubishi Electric Corporation, Chiyoda-ku (JP)

(72) Inventors: Nobuhiro Shinohara, Tokyo (JP); Hiroyuki Sekiguchi, Tokyo (JP); Hidetoshi Ikeda, Tokyo (JP); Tomoya Fujita, Tokyo (JP); Kotaro Nagaoka, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/109,592

(22) PCT Filed: Nov. 26, 2014

(86) PCT No.: PCT/JP2014/081164
§ 371 (c)(1),
(2) Date: Jul. 1, 2016

(87) PCT Pub. No.: WO2015/111298
PCT Pub. Date: Jul. 30, 2015

(65) Prior Publication Data
US 2016/0327932 A1    Nov. 10, 2016

(30) Foreign Application Priority Data
Jan. 23, 2014  (JP) .................. 2014-010679

(51) Int. Cl.
*G05B 19/18* (2006.01)
*G05B 19/402* (2006.01)
(Continued)

(52) U.S. Cl.
CPC ............ *G05B 19/402* (2013.01); *G05B 11/01* (2013.01); *H02P 5/46* (2013.01); *G05B 2219/41095* (2013.01)

(58) Field of Classification Search
CPC ...... G05B 19/18; G05B 19/402; G05B 11/01; G05B 2219/41095; H02P 5/46
(Continued)

(56) References Cited

U.S. PATENT DOCUMENTS 6,097,168 A   8/2000  Katoh et al.
6,714,842 B1  3/2004  Ito
(Continued)

FOREIGN PATENT DOCUMENTS

JP    1-79110 U    5/1989
JP    8-23691 A    1/1996
(Continued)

OTHER PUBLICATIONS

International Search Report dated Mar. 3, 2015 in PCT/JP2014/081164 filed on Nov. 26, 2014.

*Primary Examiner* — Rita Leykin
(74) *Attorney, Agent, or Firm* — Oblon, McClelland, Maier & Neustadt, L.L.P.

(57) ABSTRACT

A motor control device includes: an X-axis detector; a Y-axis detector; a trajectory command generator that outputs a first position command and a second position command; an X-axis response correction unit that outputs a corrected position command; an X-axis position control unit that generates a first torque command; a Y-axis position control unit that generates a second torque command; a Y-axis measuring instrument that detects second machine end displacement; a Y-axis zero-point estimation unit that extracts characteristics of a zero point of a transfer function on the basis of the second torque command and the machine end displacement or on the basis of the second position command and the machine end displacement; and a response-correction-parameter determination unit that sets a response correction filter by using the characteristics of the zero point.

6 Claims, 8 Drawing Sheets

(51) Int. Cl.
*G05B 11/01* (2006.01)
*H02P 5/46* (2006.01)

(58) Field of Classification Search
USPC .............. 318/600, 569, 570, 572, 574, 594; 700/245, 89, 78
See application file for complete search history.

(56) References Cited

U.S. PATENT DOCUMENTS

| | | | | |
|---|---|---|---|---|
| 7,076,314 B2* | 7/2006 | Saitou | ........................ | F15B 9/09 100/43 |
| 7,085,620 B2* | 8/2006 | Maeda | ................. | G05B 19/404 173/188 |
| 7,860,611 B2* | 12/2010 | Takenaka | ............. | B62D 57/032 318/568.12 |
| 8,005,573 B2* | 8/2011 | Takenaka | ............. | B62D 57/032 700/245 |
| 8,067,918 B2* | 11/2011 | Okita | ................... | G05B 19/404 318/625 |
| 8,947,036 B2* | 2/2015 | Amigasaya | .......... | G05B 19/237 318/400.33 |
| 9,229,339 B2* | 1/2016 | Butler | .................... | G03B 27/53 |
| 9,505,074 B2* | 11/2016 | Wada | ......................... | B25J 9/10 |
| 9,523,975 B2* | 12/2016 | Sonoda | .................... | G05B 1/01 |
| 2009/0030552 A1* | 1/2009 | Nakadai | ................. | G06N 3/008 700/258 |
| 2011/0060467 A1* | 3/2011 | Orschel | .................. | C30B 15/20 700/275 |
| 2014/0156052 A1* | 6/2014 | Nishibashi | ......... | G05B 19/4103 700/112 |
| 2016/0176004 A1* | 6/2016 | Miyaji | ................. | B23Q 15/013 700/193 |
| 2017/0017216 A1* | 1/2017 | Xing | .................... | G05B 19/042 |

FOREIGN PATENT DOCUMENTS

| | | |
|---|---|---|
| JP | 11-65663 A | 3/1999 |
| JP | 2000-339032 A | 12/2000 |
| JP | 2003-208230 A | 7/2003 |

\* cited by examiner

MOTOR CONTROL DEVICE

FIELD

The present invention relates to a motor control device.

BACKGROUND

In recent years, in a machine tool represented by an NC machine tool and a robot represented by an industrial robot, it has been desired to realize highly accurate trajectory control while performing high speed and high acceleration/deceleration driving in order to improve machining efficiency and production efficiency of the machine tool and the robot. In the machine tool and the robot, it is desired to achieve high acceleration/deceleration driving because of the reason described above. However, only by realizing high responsiveness in a position control system on each axis, a transfer function from a command to a position at a machine end on each axis cannot be matched with each other; and the trajectory of the machine end becomes distorted with respect to a command of a curved trajectory.

In Patent Literature 1 as a known example, there is a technique of reducing vibrations at a tool end during high acceleration/deceleration driving when designing a controller with taking into consideration of mechanical resonance for positioning control on a single axis. Further, in Patent Literature 2 as another example, a technique is disclosed in which synchronization performance with characteristics of the transfer function on each axis is improved to be made substantially identical, by executing feed forward control after converting a command value by a high-cut filter, of which frequency is set lower than that of a servo band of a position control loop on any axis in order to compensate a response delay with respect to a command value of a controlled amount such as position, speed, and acceleration.

CITATION LIST

Patent Literatures

Patent Literature 1: Japanese Patent Application Laid-open No. H8-23691
Patent Literature 2: Japanese Patent Application Laid-open No. 2000-339032

SUMMARY

Technical Problem

However, according to the techniques described above, if the responsiveness of a machine having low rigidity is improved to drive the machine at high acceleration/deceleration, transitional changes occur with respect to the command on each axis due to differences of the transfer functions on each axis, resulting from the low rigidity of the mechanical system, even if the response on each axis is made at a high speed. Therefore, a problem that the trajectories become distorted occurs. Particularly, when machining is performed by a machine tool or a robot with reciprocating operations on a symmetrical trajectory, the influence of an error caused by such distortions become large, thereby causing damage on a machining surface or a decrease in machining accuracy.

The present invention has been achieved in view of the above problems, and an objective of the present invention is to provide a motor control device that can execute highly accurate trajectory control even on a control target that is configured by a low-rigidity mechanical system.

Solution to Problem

To solve the above problems and achieve the object, the present invention relates to a motor control device that controls a first motor coupled to a first load machine in a first control target and that controls a second motor coupled to a second load machine in a second control target. The motor control device includes a first detector that detects a position of the first motor; a second detector that detects a position of the second motor; a trajectory command generator that outputs a first position command that is a position command for the first control target and a second position command that is a position command for the second control target; a response correction unit that carries out a calculation to apply a response correction filter to the first position command from the trajectory command generator so as to output a corrected position command; a first position control unit that receives the corrected position command from the response correction unit and a position detected by the first detector so as to generate a first torque command such that the position detected by the first detector matches the corrected position command; a second position control unit that receives the second position command from the trajectory command generator and a position detected by the second detector so as to generate a second torque command such that the position detected by the second detector matches the second position command; a measuring instrument that detects machine end displacement of the second load machine in the second control target; a zero-point estimation unit that extracts characteristics of a zero point of a transfer function from the second torque command to the machine end displacement on the basis of the second torque command and the machine end displacement or on the basis of the second position command and the machine end displacement; and a response-correction-parameter determination unit that sets the response correction filter of the response correction unit by using the characteristics of the zero point extracted by the zero-point estimation unit. A first torque command generated by the first position control unit is input to the first motor, and a second torque command generated by the second position control unit is input to the second motor.

Advantageous Effects of Invention

According to the present invention, it is feasible to obtain a motor control device that can execute highly accurate trajectory control even for a control target that is configured by a low-rigidity mechanical system.

DESCRIPTION OF EMBODIMENTS

Exemplary embodiments of a motor control device according to the present invention will be explained below in detail with reference to the accompanying drawings. The present invention is not limited to the embodiments.

First Embodiment

Figure 1:
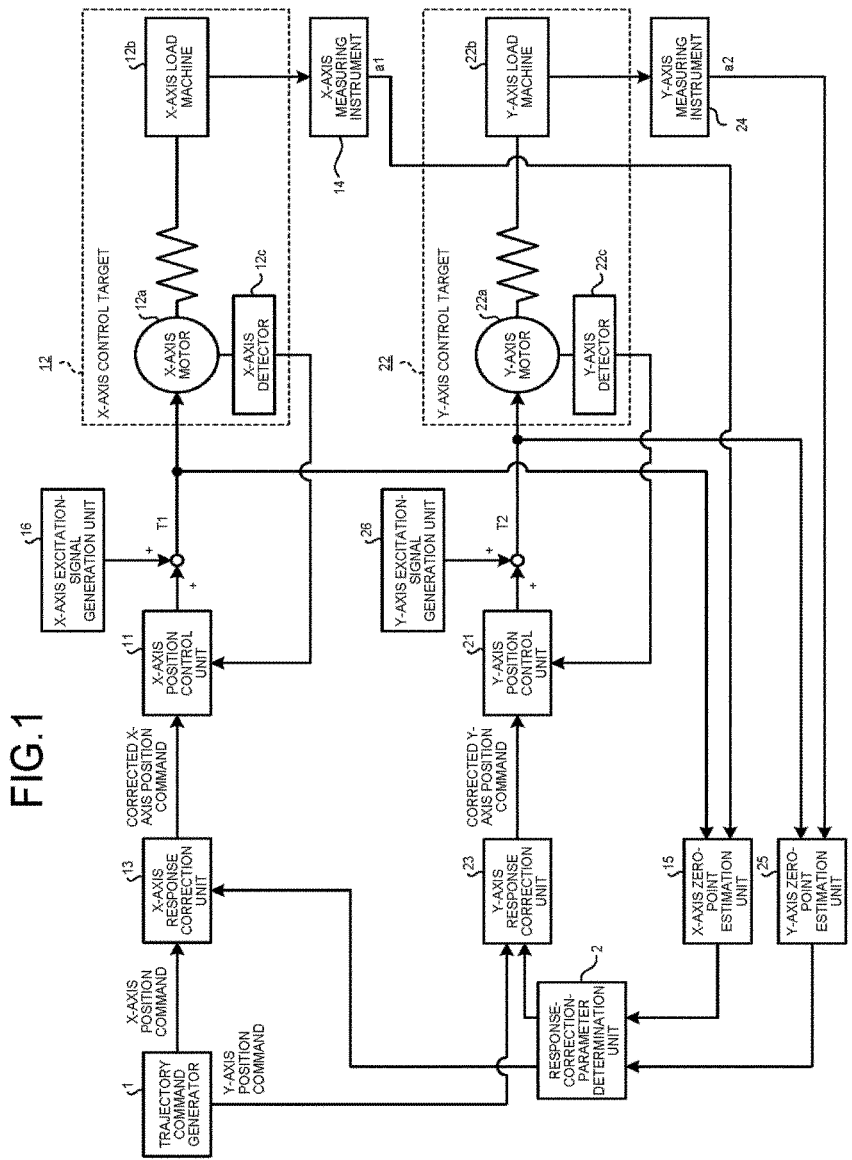
FIG. 1 is a block diagram illustrating a configuration of a motor control device according to a first embodiment.
Figure 2:
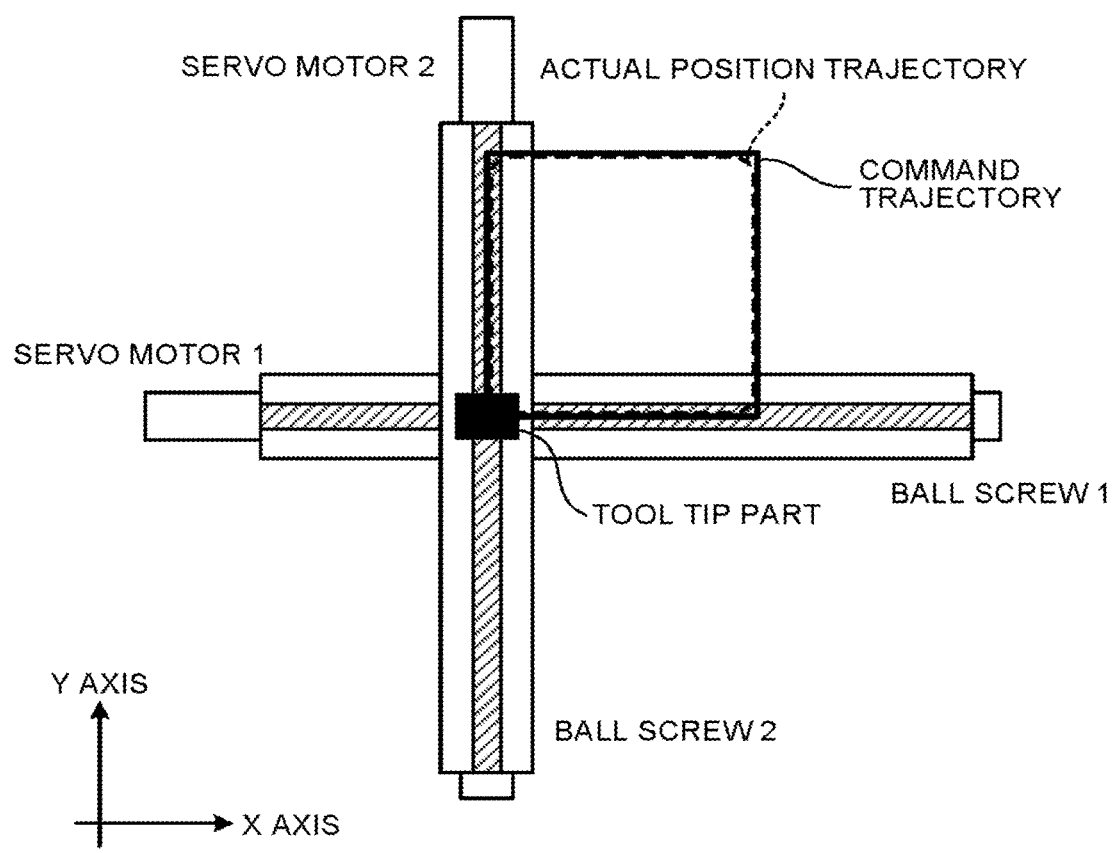
FIG. 2 is a block diagram illustrating the relation between a command trajectory and an actual trajectory drawn by a tool tip part in the motor control device according to the first embodiment.

FIG. 1 is a block diagram illustrating a configuration of a motor control device according to a first embodiment of the present invention. In the motor control device according to the present invention, highly accurate trajectory control is executed. The trajectory control, here, is to execute control by causing a trajectory of a tool tip part or a griping unit of a robot to follow a curve of a command by moving in multiple axes, i.e., two or more axes, simultaneously. The trajectory, here, refers to a line connecting positions occupied in a space by the tool tip part configured from a plurality of movable axes as it moves. In a case where the movable axes are constituted by two axes, i.e., an X axis that is a first axis and a Y axis that is a second axis, the command trajectory and the actual position trajectory drawn by the tool tip part are drawn on a two-dimensional plane as illustrated in FIG. 2. In FIG. 2, the command trajectory is indicated by a solid line and the actual trajectory is indicated by a dotted line.

A trajectory command generator 1 outputs an X-axis position command signal and a Y-axis position command signal as position command signals for the X axis and the Y axis, respectively. An X-axis response correction unit 13 corrects the X-axis position command signal from the trajectory command generator 1 by using a response correction filter $G_{xrc}(s)$, and it outputs the corrected X-axis position command to an X-axis position control unit 11. A Y-axis response correction unit 23 corrects the Y-axis position command signal from the trajectory command generator 1 by using a response correction filter $G_{yrc}(s)$, and it outputs the corrected Y-axis position command to a Y-axis position control unit 21. Characteristics of the response correction filters $G_{xrc}(s)$ and $G_{yrc}(s)$ are determined by a response-correction-parameter determination unit 2, which is described later.

An X-axis control target 12 is constituted by an X-axis motor 12a, an X-axis detector 12c attached to the X-axis motor 12a, and an X-axis load machine 12b coupled to the X-axis motor 12a. The X-axis control target 12 is driven by the X-axis motor 12a, which generates torque corresponding to an X-axis torque command T1. An X-axis measuring instrument 14 is attached to the X-axis control target 12 and measures a displacement signal of any of the position, speed, and acceleration of a machine end of the X-axis load machine 12b, which corresponds to the tool tip part. In the following descriptions, the displacement signal, which is an acceleration, is described as "X-axis machine-end displacement signal a1".

The X-axis position control unit 11 outputs the X-axis torque command T1 to the X-axis motor 12a by carrying out a calculation of PID control or two-degree-of-freedom control on the basis of the input corrected X-axis position command and a position detection value detected by the X-axis detector 12c. This is done such that the position of the X-axis motor 12a accurately follows the time-varying corrected X-axis position command output from the X-axis response correction unit 13 without vibrations.

A Y-axis control target 22 is constituted by a Y-axis motor 22a, a Y-axis detector 22c attached to the Y-axis motor 22a, and a Y-axis load machine 22b coupled to the Y-axis motor 22a. The Y-axis control target 22 is driven by the Y-axis motor 22a, which generates torque corresponding to a Y-axis torque command T2. A Y-axis measuring instrument 24 is attached to the Y-axis control target 22 so as to measure the displacement signal of any of the position, speed, and acceleration of a machine end of the Y-axis load machine 22b corresponding to the tool tip part. In the following descriptions, the displacement signal which is an acceleration and is described as "Y-axis machine-end displacement signal a2".

The Y-axis position control unit 21 outputs the Y-axis torque command T2 to the Y-axis motor 22a by carrying out a calculation of PID control or two-degree-of-freedom control on the basis of the input corrected Y-axis position command and a position detection value detected by the Y-axis detector 22c. This is done such that the position of the Y-axis motor 22a accurately follows the time-varying corrected Y-axis position command output from the Y-axis response correction unit 23 without vibrations.

With respect to the X-axis position control unit 11 and the Y-axis position control unit 21, a control parameter is set respectively such that a response delay from the corrected X-axis position command to a position of the X-axis machine end represented by double integration of the X-axis machine-end displacement signal a1, which is acceleration, and a response delay from the corrected Y-axis position command to a position of the Y-axis machine end represented by double integration of the Y-axis machine-end displacement signal a2, which is acceleration, are matched with each other. Here, the response delay represents a time delay with respect to the command when the command changes at a regular velocity rate. In this manner, when the response delays on the X axis and the Y axis are matched with each other and when the X-axis position command and the Y-axis position command change at a regular velocity rate, then the trajectory drawn by the position of the X-axis machine end and the position of the Y-axis machine end match the trajectory drawn by the positions of the corrected X-axis position command and the corrected Y-axis position command, respectively.

An X-axis excitation-signal generation unit 16 generates a signal having an M-sequence waveform for a time predetermined by an adjustment-start instruction operation performed by a user when parameter adjustment is performed for the motor control device according to the present embodiment, and it adds an M-sequence excitation signal to the X-axis torque command T1 to drive the X-axis motor 12a, thereby exciting the X-axis control target 12.

Similar to the X-axis excitation-signal generation unit 16, a Y-axis excitation-signal generation unit 26 generates a signal having an M-sequence waveform for a predetermined time, and it adds an M-sequence excitation signal to the Y-axis torque command T2 to drive the Y-axis motor 22a, thereby exciting the Y-axis control target 22. In this case, the M-sequence excitation signal is a pseudo-white random signal.

An X-axis zero-point estimation unit 15 performs system identification by using the X-axis torque command T1 at the time of the excitation signal that is generated by the X-axis excitation-signal generation unit 16 and the X-axis machine-end displacement signal a1 that is detected by the X-axis measuring instrument 14, which are input and output data; estimates a transfer function $G_{fax}(s)$ from the X-axis torque command T1 to the X-axis machine-end displacement signal a1; and outputs the result of extracting information on the zero point on the X axis to the response-correction-parameter determination unit 2.

A Y-axis zero-point estimation unit 25 performs system identification by using the Y-axis torque command T2 at the time of the excitation signal that is generated by the Y-axis excitation-signal generation unit 26 and the Y-axis machine-end displacement signal a2 that is detected by the Y-axis measuring instrument 24, which are input and output data; estimates a transfer function $G_{fay}(s)$ from the Y-axis torque command T2 to the Y-axis machine-end displacement signal a2; and outputs the result of extracting information on the zero point on the Y axis to the response-correction-parameter determination unit 2.

The response-correction-parameter determination unit 2 determines and sets characteristics of the response correction filter $G_{xrc}(s)$ of the X-axis response correction unit 13 on the basis of the information on the zero point on the Y axis, and it determines and sets characteristics of the response correction filter $G_{yrc}(s)$ of the Y-axis response correction unit 23 on the basis of the information on the zero point on the X axis.

In the system identification by the X-axis zero-point estimation unit 15, the X-axis excitation-signal generation unit 16 adds the M-sequence excitation signal to the X-axis torque command T1 to excite the X-axis control target 12 and acquires responses of the X-axis torque command T1 and the X-axis machine-end displacement signal a1 detected by the X-axis measuring instrument 14 as data. The transfer function $G_{fax}(s)$ from the X-axis torque command T1 to the X-axis machine-end displacement signal a1 is estimated by using, for example, a least square method on the input and output data at the time of M-sequence excitation. A feature of the transfer function $G_{fax}(s)$ from the X-axis torque command T1 to the X-axis machine-end displacement signal a1 is described here. As it is given that the X-axis machine-end displacement signal a1 is assumed to be acceleration of the machine end, the transfer function $G_{fax}(s)$ is generally approximated by the following expression (1).

[Expression 1]

$$G_{fax}(s) = \frac{1}{J_x} \frac{\prod_{j=1}^{m}\left(\frac{1}{\omega_{zxj}^2}s^2 + 2\frac{\zeta_{zxj}}{\omega_{zxj}}s + 1\right)}{\prod_{i=1}^{n}\left(\frac{1}{\omega_{pxi}^2}s^2 + 2\frac{\zeta_{pxi}}{\omega_{pxi}}s + 1\right)} \quad (1)$$

In this expression, s denotes a Laplace operator; $J_x$ denotes an inertia moment of the X-axis control target 12; $\omega_{pxi}$ denotes a resonance frequency in an ith mode; $\zeta_{pxi}$ denotes a damping ratio of the resonance frequency in the ith mode; $\omega_{zxj}$ denotes the jth antiresonant frequency, i.e., an absolute value of complex zero; and $\zeta_{zxj}$ denotes the jth antiresonant characteristic, i.e., the damping ratio of the complex zero.

When it is assumed that a control target is a two-inertia system in which the motor and load inertia are linked by a spring or is a multiple inertia system in which a motor and a plurality of inertial loads are serially linked by a spring, and the displacement of the tip part thereof is a machine-end displacement signal, then antiresonance does not appear and the degree of the numerator is approximated as 0, i.e., m=0. However, the actual structure of a machine system is complicated, and an antiresonant zero point may often be included in the transfer function from the torque generated by the motor to the machine end displacement. In this case, is must be assumed that m≥1 when modeling.

The actual machine system is an infinite dimensional system in a precise sense, which, however, may be modeled as such a low dimensional degree model that a response thereof can be approximated by using the degree of the numerator as m=1 or m=2. If it is given that the numerator of the transfer function at this time is assumed to be $N_x(s)$, then $N_x(s)$ is expressed by the following expression (2):

[Expression 2]

$$N_x(s) = \prod_{j=1}^{m}\left(\frac{1}{\omega_{zxj}^2}s^2 + 2\frac{\zeta_{zxj}}{\omega_{zxj}}s + 1\right) \quad (2)$$

The X-axis zero-point estimation unit 15 outputs information on the zero point, i.e., information on a polynomial expression of the above expression (2), to the response-correction-parameter determination unit 2 via the above operation.

The system identification performed by the Y-axis zero-point estimation unit 25 is an operation similar to that in the case of the X axis, in which the Y-axis excitation-signal generation unit 26 adds the M-sequence excitation signal to the Y-axis torque command T2 to excite the Y-axis control target 22, and it acquires responses of the Y-axis torque command T2 and the Y-axis machine-end displacement signal a2 detected by the Y-axis measuring instrument 24 as data. The transfer function $G_{fay}(s)$ from the Y-axis torque command T2 to the Y-axis machine-end displacement signal a2 is estimated by using, for example, the least square method on the input and output data at the time of M-sequence excitation. The transfer function $G_{fay}(s)$ here is generally approximated by the following expression (3):

[Expression 3]

$$G_{fay}(s) = \frac{1}{J_y} \frac{\prod_{j=1}^{m}\left(\frac{1}{\omega_{zyj}^2}s^2 + 2\frac{\zeta_{zyj}}{\omega_{zyj}}s + 1\right)}{\prod_{i=1}^{n}\left(\frac{1}{\omega_{pyi}^2}s^2 + 2\frac{\zeta_{pyi}}{\omega_{pyi}}s + 1\right)} \quad (3)$$

In this expression, $J_y$ denotes an inertia moment of the Y-axis control target 22; $\omega_{pyi}$ denotes a resonance frequency in the ith mode; $\zeta_{pyi}$ denotes a damping ratio of the resonance frequency in the ith mode; $\omega_{zyj}$ denotes the jth antiresonant frequency, i.e., an absolute value of complex zero; and $\zeta_{zyj}$ denotes the jth antiresonant characteristic, i.e., a damping ratio of the complex zero.

Similar to the case of the X axis described above, the degree of the numerator may be approximated as m=1 or m=2 also for the Y axis. Given that the numerator of the transfer function at this time is assumed to be $N_y(s)$, then $N_y(s)$ is represented by the following expression (4).

[Expression 4]

$$N_y(s) = \prod_{j=1}^{m} \left( \frac{1}{\omega_{zyj}^2} s^2 + 2 \frac{\zeta_{zyj}}{\omega_{zyj}} s + 1 \right) \quad (4)$$

The Y-axis zero-point estimation unit 25 outputs information on the zero point, i.e., information on a polynomial expression of the above expression (4), to the response-correction-parameter determination unit 2 with the above operation.

The response-correction-parameter determination unit 2 determines the response correction filter $G_{xrc}(s)$ of the X-axis response correction unit 13 by using the following expression (5), which is expressed by using the polynomial expression $N_y(s)$ of the transfer function representing the zero point included in the transfer function $G_{fay}(s)$ from the Y-axis torque command T2 to the Y-axis machine-end displacement signal a2 extracted by the Y-axis zero-point estimation unit 25 and a low-pass filter F(s).

[Expression 5]

$$G_{xrc}(s) = F(s)*N_y(s) \quad (5)$$

F(s) on the right side in the expression (5) denotes a low-pass filter for making the response correction filter $G_{xrc}(s)$ to be proper. The low-pass filter F(s) decreases frequency components higher than a control band, which are part of the X-axis position command signal output from the trajectory command generator 1, so as to suppress an abrupt change and to make the X-axis position command signal smooth. If the X-axis position command signal is originally generated as a smooth signal, F(s) can be equal to 1.

The response-correction-parameter determination unit 2 determines the response correction filter $G_{yrc}(S)$ of the Y-axis response correction unit 23 by using the following expression (6), which is expressed by using the polynomial expression $N_x(s)$ of the transfer function representing the zero point included in the transfer function $G_{fax}(s)$ from the X-axis torque command T1 to the X-axis machine-end displacement signal a1 extracted by the X-axis zero-point estimation unit 15 and the low-pass filter F(s):

[Expression 6]

$$G_{yrc}(s) = F(s)*N_x(s) \quad (6)$$

F(s) on the right side in the expression (6) denotes the low-pass filter, which is the same as that used in expression (5).

In the X-axis position control unit 11 and the Y-axis position control unit 21, the fact that the delay times with respect to the commands on the X axis and the Y axis are made identical to each other means setting the control parameters of the X-axis position control unit 11 and the Y-axis position control unit 21 such that a response delay from the corrected X-axis position command to the position of the X-axis machine end represented by the double integration of the X-axis machine-end displacement signal a1, which is acceleration, and a response delay from the corrected Y-axis position command to the position of the Y-axis machine end represented by the double integration of the Y-axis machine-end displacement signal a2, which is acceleration, are matched with each other, as described as above.

Therefore, if there is no zero point in the X-axis control target and the Y-axis control target, the transfer function from the X-axis position command $x_{ref}$ to the X-axis machine end position $x_a$ is represented by the following expression (7), where a denominator polynomial of the transfer function from $x_{ref}$ to $x_a$ is assumed to be D(s). Because the response delay from the corrected X-axis position command to the X-axis machine-end displacement signal a1 and the response delay from the corrected Y-axis position command to the Y-axis machine-end displacement signal a2 are matched with each other, the relation between the Y-axis position command $y_{ref}$ and the Y-axis machine end position $y_a$ is represented by the following expression (8).

[Expression 7]

$$x_a(s) = \frac{1}{D(s)} F(s) x_{ref}(s) \quad (7)$$

[Expression 8]

$$y_a(s) = \frac{1}{D(s)} F(s) y_{ref}(s) \quad (8)$$

Furthermore, if there is a zero point in the transfer function from the X-axis torque command T1 to the X-axis machine end position $x_a$ and in the transfer function from the Y-axis torque command T2 to the Y-axis machine end position $y_a$, and even if the command response characteristics are changed by changing the characteristics of the position controller of the X-axis position control unit 11, then the zero point is stored. Therefore, the relation between the X-axis position command $x_{ref}$ and the X-axis machine end position $x_a$ is represented by the following expression (9). Further, similar to the case of the X axis, the relation between the Y-axis position command $y_{ref}$ and the Y-axis machine end position $y_a$ is represented by the following expression (10):

[Expression 9]

$$x_a(s) = \frac{N_x(s)}{D(s)} F(s) x_{ref}(s) \quad (9)$$

[Expression 10]

$$y_a(s) = \frac{N_y(s)}{D(s)} F(s) y_{ref}(s) \quad (10)$$

Therefore, if the characteristics of the zero points on the X axis and the Y axis are different from each other ($N_x(s) \neq N_y(s)$), the trajectories by the X-axis machine end position $x_a$ and the Y-axis machine end position $y_a$ become distorted in a command curve due to the corrected X-axis position command and the corrected Y-axis position command, which are affected by the zero point. Therefore, correction is required such that the curve is not distorted, even if there is a zero point in the X-axis control target and the Y-axis control target. As a method of performing correction described above, an initial approach is to cancel out the zero points $N_x(s)$ and $N_y(s)$, which appear in the expressions (9) and (10) described above. In the case where this method is applied, if an inverse function of $N_x(s)$ is set as the characteristics of the response correction filter $G_{xrc}(s)$ of the X-axis response correction unit 13 and an inverse function of $N_y(s)$ is set as the characteristics of the response correction filter $G_{yrc}(s)$ of the Y-axis response correction unit 23, the response of the X-axis machine end position $x_a$ with respect to the X-axis position command $x_{ref}$ and the response of the Y-axis machine end position $y_a$ with respect to the Y-axis position command $y_{ref}$ become identical to each other. This is represented in the following expressions (11) and (12) as ideal expressions.

[Expression 11]

$$x_a(s) = \frac{N_x(s)}{D(s)} \frac{1}{N_x(s)} F(s) x_{ref}(s) \quad (11)$$
$$= \frac{1}{D(s)} F(s) x_{ref}(s)$$

[Expression 12]

$$y_a(s) = \frac{N_y(s)}{D(s)} \frac{1}{N_y(s)} F(s) y_{ref}(s) \quad (12)$$
$$= \frac{1}{D(s)} F(s) y_{ref}(s)$$

However, if set as described above, because a filter of a secondary resonant system is used as the response correction filter on the X axis and the Y axis, then, the torque command and the position of the motor become vibrational, even if the machine end positions on the respective axes do not vibrate. Further, if there is an error in the estimation of the zero point, the machine end also becomes vibrational. Therefore, it is not appropriate to set the response correction filters on the X axis and the Y axis to cancel out the antiresonant characteristics as described above. Accordingly, in the present embodiment, by the operation of the response-correction-parameter determination unit 2, the characteristic $N_y(s)$ of the zero point on the Y axis is assigned to the response correction filter $G_{xrc}(s)$ of the X-axis response correction unit 13; and the characteristic $N_x(s)$ of the zero point on the X-axis is assigned to the response correction filter $G_{yrc}(s)$ of the Y-axis response correction unit 23. At this time, the characteristics from the X-axis position command $x_{ref}$ to the X-axis machine end position $x_a$ and the characteristics from the Y-axis position command $y_{ref}$ to the Y-axis machine end position $y_a$ are represented respectively by the following expressions (13) and (14).

[Expression 13]

$$x_a(s) = \frac{N_x(s)}{D(s)} N_y(s) F(s) x_{ref}(s) \quad (13)$$

[Expression 14]

$$y_a(s) = \frac{N_y(s)}{D(s)} N_x(s) F(s) y_{ref}(s) \quad (14)$$

According to the above configuration, the transfer function from the position command signal on the X axis to the load machine position on the X axis and the transfer function from the position command signal on the Y axis to the load machine position on the Y axis become identical to each other.

Figure 3:
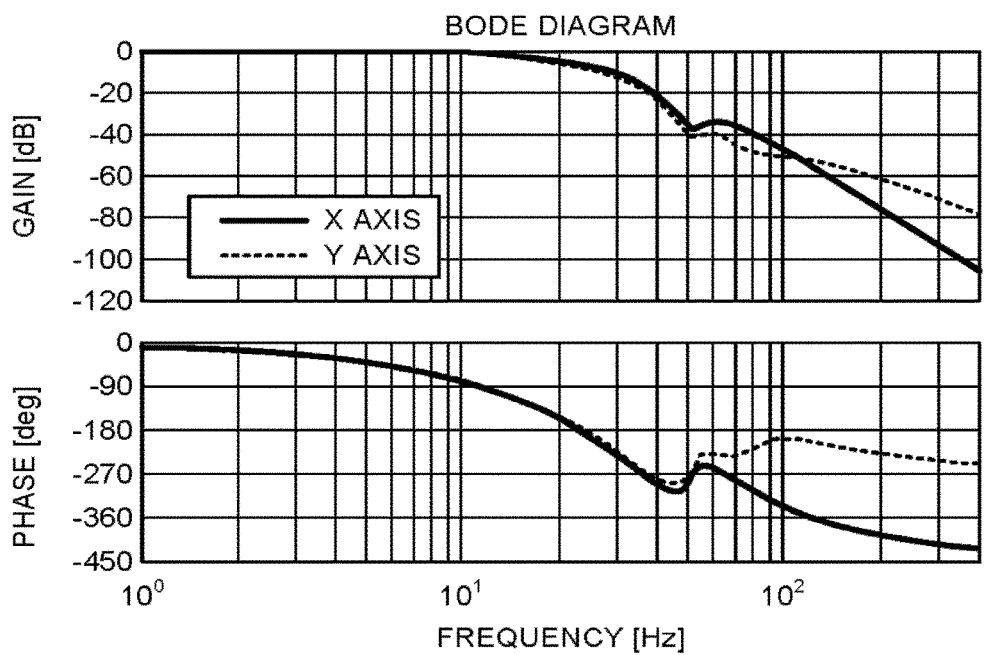
FIG. 3 is an example, for comparative purposes of the motor control device according to the first embodiment, in which is illustrated a Bode diagram of transfer functions on an X axis and on a Y axis in a state where an X-axis response correction unit and a Y-axis response correction unit are not applied.

FIG. 3 is a Bode diagram of the transfer functions, with regard to a certain tool machine, on the X axis and on the Y axis in a state where the X-axis response correction unit and the Y-axis response correction unit are not applied. In FIG. 3, the characteristics of the transfer functions on the X axis and the Y axis are different from each other due to the influence of the zero points on the respective axes.

Figure 4:
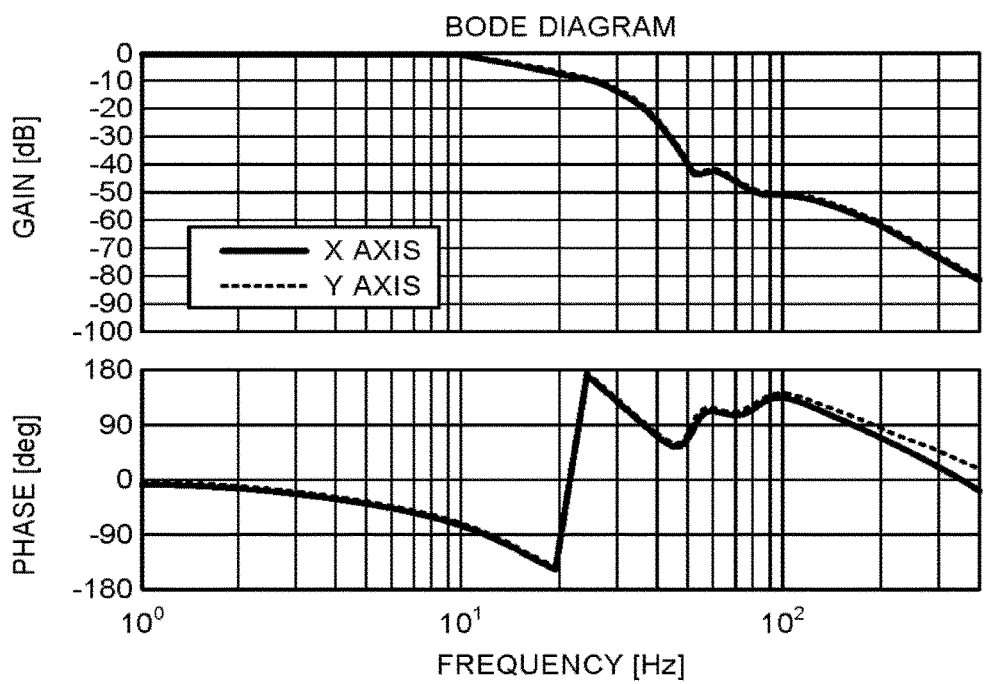
FIG. 4 is a Bode diagram of transfer functions on an X axis and on a Y axis in a state where the X-axis response correction unit and the Y-axis response correction unit are applied to the motor control device according to the first embodiment.

FIG. 4 is a Bode diagram of the transfer functions on the X axis and on the Y axis in a state where the X-axis response correction unit and the Y-axis response correction unit are applied in the present invention. In FIG. 4, the transfer functions on the X axis and the Y axis are identical to each other, as a result that the X-axis response correction unit and the Y-axis response correction unit are applied.

Because the motor control device according to the present embodiment operates as described above, transient responses with respect to the command on the X axis and the Y axis become identical to each other. Therefore, trajectory control without distortion of response can be executed with respect to the command trajectory at a high speed with high accuracy, while reducing a trajectory following error with respect to the command trajectory and vibrations even though a curved trajectory is drawn by a control target having low rigidity. Further, the circularity that is an index at the time of drawing a circular arc can be increased.

In the present embodiment, the X-axis zero-point estimation unit 15 receives and uses input of the X-axis torque command T1 to estimate the zero point on the X axis. However, the zero point does not change, even if the characteristics of the X-axis position control unit 11 are changed. Therefore, the zero point of the transfer function from the X-axis torque command T1 to the X-axis machine-end displacement signal a1 can be extracted by using the X-axis position command instead of using the X-axis torque command T1. Similarly, in the Y-axis zero-point estimation unit 25, the Y-axis position command can be used.

In the present embodiment, as the X-axis motor 12*a* and the Y-axis motor 22*a*, any of a DC motor, a permanent-magnet synchronous motor, and an induction motor can be used; and the motor used is not limited to a rotary motor, and a linear motor can be used.

In the present embodiment, a signal, which is provided by the X-axis excitation-signal generation unit 16 to the X-axis torque command as an input, is a signal containing various frequency components; and an M-sequence excitation signal, a sine sweep signal, or a random signal can be used as an input signal, so long as the X-axis load machine 12*b* can be driven at a steady acceleration or more. As a signal which is provided by the Y-axis excitation-signal generation unit 26 to the Y-axis torque command as an input, the M-sequence excitation signal, the sine sweep signal, or the random signal can be used as the input signal similar to the case of the X axis. Further, if a machine is provided with a function of inputting any of the excitation signals described above to the X-axis torque command and the Y-axis torque command, the X-axis excitation-signal generation unit 16 and the Y-axis excitation-signal generation unit 26 may not be provided.

In the present embodiment, the system identification is performed by using the least square method. However, the method is not limited thereto, and another method represented by a spectral analysis technique, a multi-decimation identification method on the basis of an ARX model, or other method represented by an MOESP method can be used.

In the present embodiment, the X-axis measuring instrument 14 and the Y-axis measuring instrument 24 that respectively detect the X-axis machine-end displacement signal a1 and the Y-axis machine-end displacement signal a2 are required only at the time of parameter adjustment. Therefore, the X-axis measuring instrument 14 and the Y-axis measuring instrument 24 can be made detachable and they may be detached after adjustment. That is, the sensor may not be provided when operated as the motor control device.

As described above, according to the present embodiment, highly accurate trajectory control can be executed even in a case where the control target is configured by a low-rigidity mechanical system. This is done by setting the response correction unit on each axis by the response-correction-parameter determination unit on the basis of the characteristics of the zero point on each axis acquired by the zero-point estimation unit and by setting the transfer function from the command to the machine end position on each axis to be the same.

Second Embodiment

Figure 5:
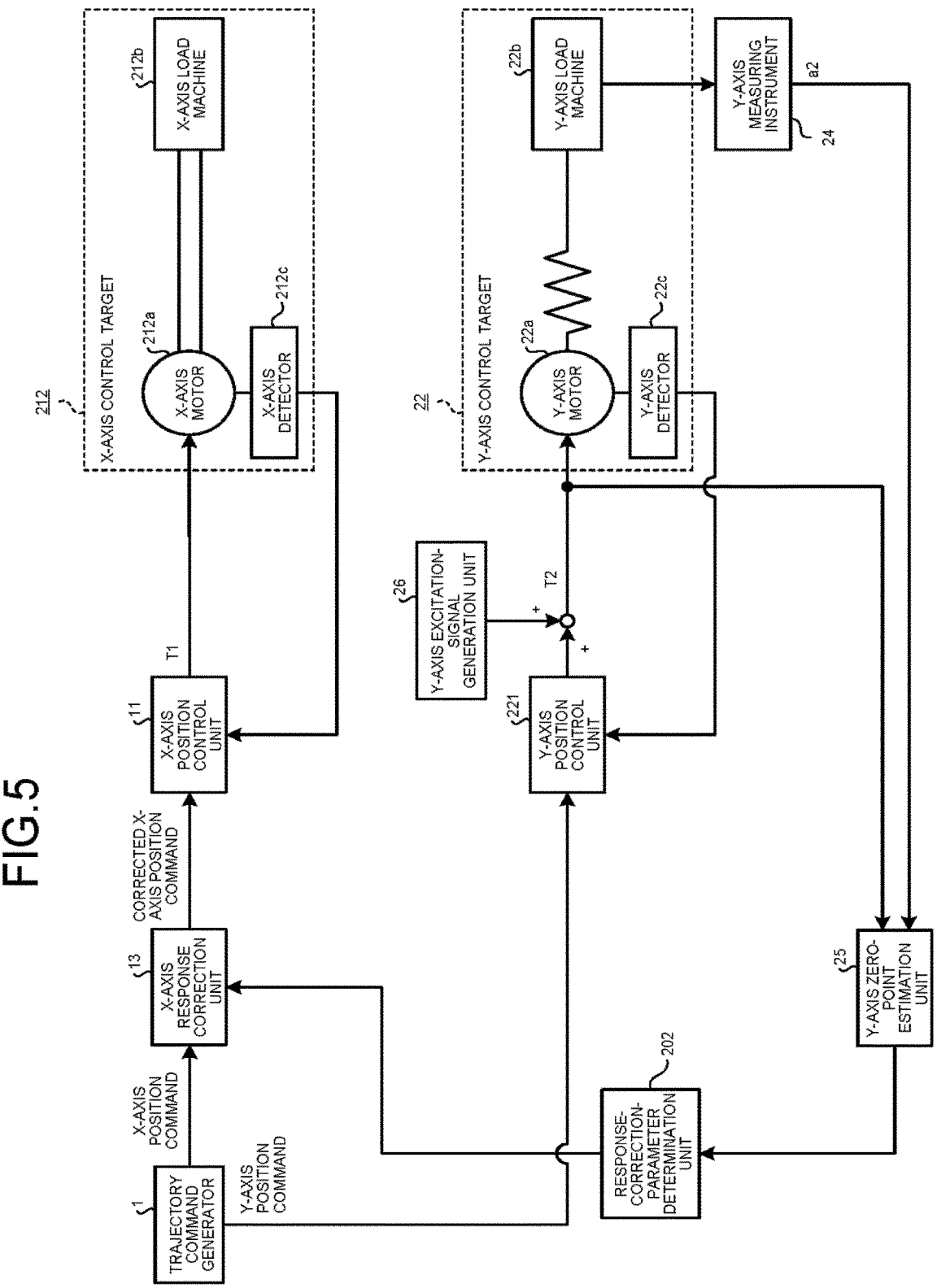
FIG. 5 is a block diagram illustrating a configuration of a motor control device according to a second embodiment.

FIG. 5 is a block diagram illustrating a configuration of a motor control device according to a second embodiment of the present invention. In the second embodiment, blocks denoted with reference signs identical to those of the first embodiment illustrated in FIG. 1 have functions equivalent to those of the first embodiment, and redundant descriptions of the configurations and operations thereof will be omitted.

An X-axis control target 212 is constituted by an X-axis motor 212a, an X-axis detector 212c attached to the X-axis motor 212a, and an X-axis load machine 212b coupled to the X-axis motor 212a. The X-axis motor 212a and the X-axis load machine 212b are coupled to each other with high rigidity, and the behavior of the X-axis load machine 212b is detected by the X-axis detector 212c. The X-axis control target 212 is driven by the X-axis motor 212a that generates torque on the basis of the X-axis torque command T1. As a control target having such rigidity, an NC (Numerical Control) lathe can be mentioned as an example.

With respect to the X-axis position control unit 11 and a Y-axis position control unit 221, a control parameter, which is used for a control calculation of the X-axis position control unit 11 and the Y-axis position control unit 221, is set respectively such that a response delay from the corrected X-axis position command to a position of the X-axis machine end represented by double integration of the X-axis machine-end displacement signal a1 that is the acceleration and a response delay from the corrected Y-axis position command to a position of the Y-axis machine end represented by double integration of the Y-axis machine-end displacement signal a2 that is the acceleration are matched with each other.

A response-correction-parameter determination unit 202 determines the response correction filter $G_{xrc}(s)$ of the X-axis response correction unit 13 on the basis of the following expression (15), which uses the polynomial expression $N_y(s)$ of the transfer function representing the zero point included in the transfer function $G_{fay}(s)$ from the Y-axis torque command T2 to the Y-axis machine-end displacement signal a2 extracted by the Y-axis zero-point estimation unit 25 and the low-pass filter F(s). Similar to the first embodiment, the low-pass filter F(s) on the right side in the following expression (15) decreases frequency components higher than a control band, of the X-axis position command signal output from the trajectory command generator 1, to reduce an abrupt change and smooth the X-axis position command signal.

[Expression 15]

$$G_{xrc}(s) = F(s) * N_y(s) \quad (15)$$

When the rigidity of the X-axis control target 212 is high, the transfer function $G_{fax}(s)$ from the X-axis torque command T1 to the acceleration of the X-axis machine end is approximated by the following expression (16). Here, the acceleration of the X-axis machine end can be acquired by differentiating a detection value of the X-axis detector 212c twice, because the X-axis motor 212a and the X-axis load machine 212b are coupled to each other with high rigidity. Further, regarding the Y-axis control target 22 similar to the first embodiment, if the Y-axis machine-end displacement signal a2 is assumed to be the acceleration of the machine end, the transfer function $G_{fay}(s)$ from the Y-axis torque command T2 to the Y-axis machine-end displacement signal a2 detected by the Y-axis measuring instrument 24 is approximated by the following expression (17)

[Expression 16]

$$G_{fax}(s) = \frac{1}{J_x} \quad (16)$$

[Expression 17]

$$G_{fay}(s) = \frac{1}{J_y} \frac{\prod_{j=1}^{m}\left(\frac{1}{\omega_{zyj}^2}s^2 + 2\frac{\zeta_{zyj}}{\omega_{zyj}}s + 1\right)}{\prod_{i=1}^{n}\left(\frac{1}{\omega_{pyi}^2}s^2 + 2\frac{\zeta_{pyi}}{\omega_{pyi}}s + 1\right)} \quad (17)$$

At this time, if a denominator polynomial of the transfer function from the X-axis position command $x_{ref}$ to the X-axis machine end position $x_a$ is assumed to be D(s), the transfer function from $x_{ref}$ to $x_a$ is represented by the following expression (18) by using the polynomial expression D(s). Further, the transfer function from the Y-axis position command $y_{ref}$ to the Y-axis machine end position $y_a$ is represented by the following expression (19).

[Expression 18]

$$x_a(s) = \frac{1}{D(s)} F(s) x_{ref}(s) \quad (18)$$

[Expression 19]

$$y_a(s) = \frac{N_y(s)}{D(s)} F(s) y_{ref}(s) \quad (19)$$

Similar to the first embodiment, the response-correction-parameter determination unit 202 does not cancel out the zero point by using the inverse function, but uses a method of assigning the characteristic $N_y(s)$ of the zero point on the Y axis to the response correction filter $G_{xrc}(s)$ of the X-axis response correction unit 13. At this time, the characteristics from the X-axis position command $x_{ref}$ to the X-axis machine end position $x_a$ and the characteristics from the Y-axis position command $y_{ref}$ to the Y-axis machine end position $y_a$ are respectively represented by the following expressions (20) and (21), and the transfer functions on the X axis and the Y axis can be matched with each other.

[Expression 20]

$$x_a(s) = \frac{1}{D(s)} N_y(s) F(s) x_{ref}(s) \quad (20)$$

[Expression 21]

$$y_a(s) = \frac{N_y(s)}{D(s)} F(s) y_{ref}(s) \quad (21)$$

Because the motor control device according to the present embodiment operates as described above, transient responses with respect to the command on the X axis and the Y axis become identical to each other. Therefore, trajectory control without distortion of response can be executed with respect to the command trajectory at a high speed and with high accuracy, while reducing trajectory following errors with respect to the command trajectory and vibrations, even if a curved trajectory is drawn by a control target having an axis with low rigidity and an axis with high rigidity. Further, the circularity that is an index at the time of drawing a circular arc can be increased. When rigidity of one axis, of the two axes of the control target, is high, trajectory control can be executed with less number of measurement sensors and fewer correction calculations.

Third Embodiment

Figure 6:
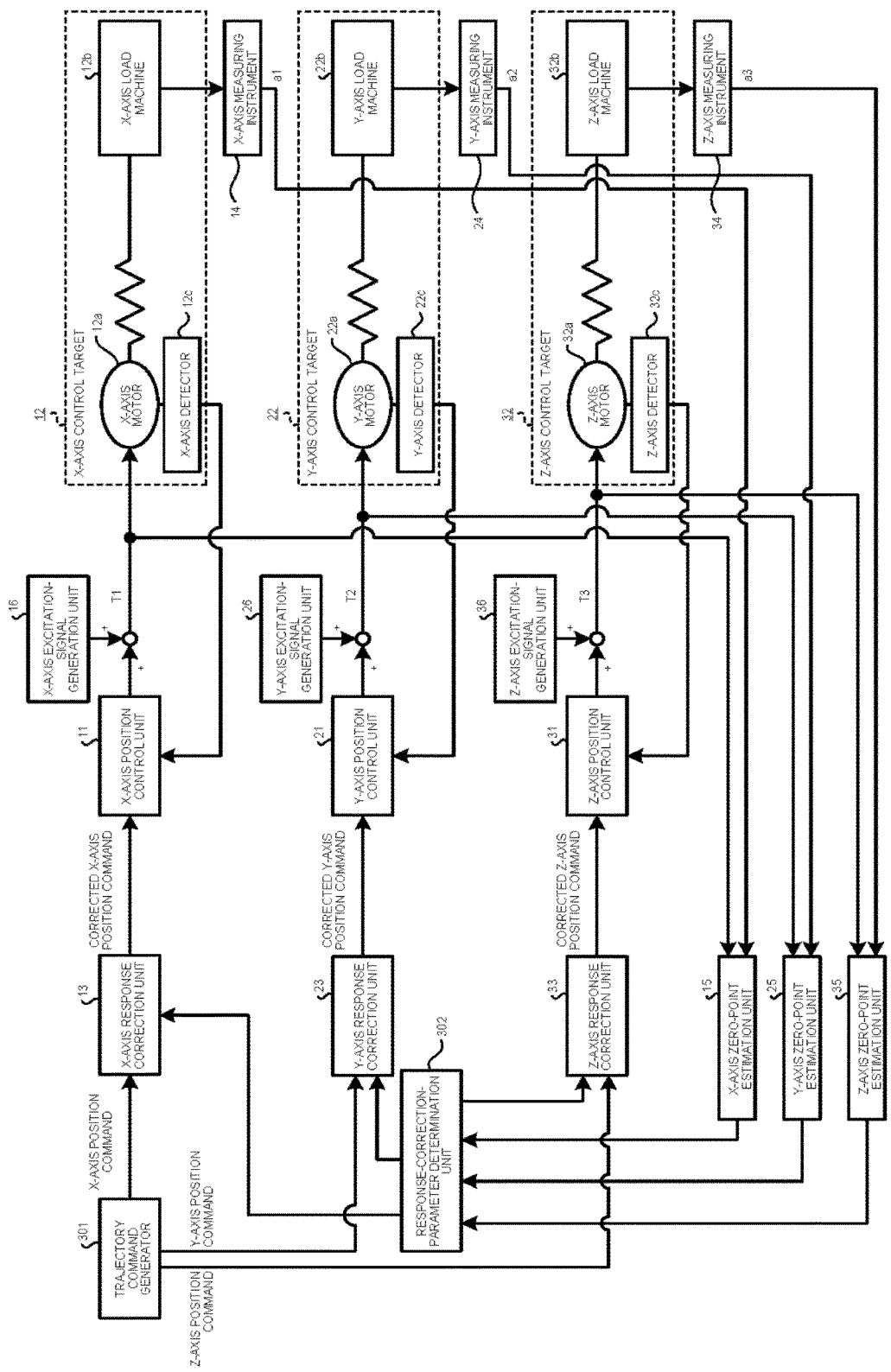
FIG. 6 is a block diagram illustrating a configuration of a motor control device according to a third embodiment.

FIG. 6 is a block diagram illustrating a configuration of a motor control device according to a third embodiment of the present invention. In the third embodiment, blocks denoted with reference signs identical to those of the first embodiment illustrated in FIG. 1 have functions equivalent to those of the first embodiment, and redundant descriptions of the configurations and operations thereof will be omitted. As illustrated in FIG. 6, the motor control device according to the third embodiment has a configuration in which a Z axis, which is the third axis, is added to the motor control device according to the first embodiment.

A trajectory command generator 301 outputs an X-axis position command signal, a Y-axis position command signal, and a Z-axis position command signal, which are position command signals for the X axis, the Y axis, and the Z axis, respectively.

A Z-axis response correction unit 33 corrects the Z-axis position command signal from the trajectory command generator 301 by using a response correction filter $G_{zrc}(s)$, and it outputs a corrected Z-axis position command to a Z-axis position control unit 31. Characteristics of the response correction filter $G_{zrc}(s)$ are determined by a response-correction-parameter determination unit 302 which is described later.

A Z-axis control target 32 is constituted by a Z-axis motor 32a, a Z-axis detector 32c attached to the Z-axis motor 32a, and a Z-axis load machine 32b coupled to the Z-axis motor 32a. The Z-axis control target 32 is driven by the Z-axis motor 32a that generates torque corresponding to a Z-axis torque command T3. A Z-axis measuring instrument 34 is attached to the Z-axis control target 32 to measure a displacement signal of any of the position, speed, and acceleration of a machine end of the Z-axis load machine 32b, which corresponds to the tool tip part. In the following descriptions, the displacement signal, which is the acceleration, is described as "Z-axis machine-end displacement signal a3".

The Z-axis position control unit 31 outputs the Z-axis torque command T3 to the Z-axis motor 32a by carrying out a calculation of PID control or two-degree-of-freedom control on the basis of the input corrected Z-axis position command and a position detection value detected by the Z-axis detector 32c. This is done such that the position of the Z-axis motor 32a accurately follows the time-varying corrected Z-axis position command output from the Z-axis response correction unit 33 without vibrations.

With respect to the X-axis position control unit 11, the Y-axis position control unit 21, and the Z-axis position control unit 31, a control parameter is set respectively such that a response delay from the corrected X-axis position command to the position of the X-axis machine end represented by double integration of the X-axis machine-end displacement signal a1 that is the acceleration, a response delay from the corrected Y-axis position command to the position of the Y-axis machine end represented by double integration of the Y-axis machine-end displacement signal a2 that is the acceleration, and a response delay from the corrected Z-axis position command to a position of the Z-axis machine end represented by double integration of the Z-axis machine-end displacement signal a3 that is the acceleration are matched with each other.

A Z-axis excitation-signal generation unit 36 generates a signal having an M-sequence waveform for a time predetermined by an adjustment-start instruction operation performed by a user, when parameter adjustment is performed by the motor control device according to the present embodiment, and it adds an M-sequence excitation signal to the Z-axis torque command T3 to drive the Z-axis motor 32a, thereby exciting the Z-axis control target 32.

A Z-axis zero-point estimation unit 35 performs system identification by using the Z-axis torque command T3 at the time of generating the excitation signal by the Z-axis excitation-signal generation unit 36 as described above and the Z-axis machine-end displacement signal a3 detected by the Z-axis measuring instrument 34, which are input and output data; estimates a transfer function $G_{faz}(s)$ from the Z-axis torque command T3 to the Z-axis machine-end displacement signal a3; and outputs a result of extracting information of the zero point on the Z-axis to the response-correction-parameter determination unit 302.

The response-correction-parameter determination unit 302 determines and sets the characteristics of the response correction filter $G_{xrc}(s)$ of the X-axis response correction unit 13 on the basis of the information of the zero point on the Y axis and the zero point on the Z axis; determines and sets the characteristics of the response correction filter $G_{yrc}(s)$ of the Y-axis response correction unit 23 on the basis of the information of the zero point on the X axis and the zero point on the Z axis; and determines and sets characteristics of the response correction filter $G_{zrc}(s)$ of the Z-axis response correction unit 33 on the basis of the information of the zero point on the X axis and the zero point on the Y axis.

In the system identification by the Z-axis zero-point estimation unit 35, similar to the case of the X axis and the Y axis described in the first embodiment, the Z-axis excitation-signal generation unit 36 adds the M-sequence excitation signal to the Z-axis torque command T3 to excite the Z-axis control target 32, and acquires responses of the Z-axis torque command T3 and the Z-axis machine-end displacement signal a3 detected by the Z-axis measuring instrument 34 as data. The transfer function $G_{faz}(s)$ from the Z-axis torque command T3 to the Z-axis machine-end displacement signal a3 is estimated by using, as an example, the least square method with respect to the input and output data at the time of M-sequence excitation. The characteristics of the transfer function $G_{faz}(s)$ from the Z-axis torque command T3 to the Z-axis machine-end displacement signal a3 are described here. When the Z-axis machine-end displacement signal a3 is assumed to be the acceleration of the machine end, the transfer function $G_{faz}(s)$ is generally approximated by the following expression (22).

[Expression 22]

$$G_{faz}(s) = \frac{1}{J_z} \frac{\prod_{j=1}^{m}\left(\frac{1}{\omega_{zzj}^2}s^2 + 2\frac{\zeta_{zzj}}{\omega_{zzj}}s + 1\right)}{\prod_{i=1}^{n}\left(\frac{1}{\omega_{pzi}^2}s^2 + 2\frac{\zeta_{pzi}}{\omega_{pzi}}s + 1\right)} \quad (22)$$

In this expression, $J_z$ denotes an inertia moment of the Z-axis control target 32. $\omega_{pzi}$ denotes a resonance frequency in the ith mode, $\zeta_{pzi}$ denotes a damping ratio of the resonance frequency in the ith mode, $\omega_{zzj}$ denotes the jth antiresonant frequency, i.e., an absolute value of complex zero, $\zeta_{zzj}$ denotes the jth antiresonant characteristic, i.e., a damping ratio of the complex zero.

Similar to the X axis and the Y axis in the above embodiments, the degree of the numerator may be approximated as m=1 or m=2. When the numerator of the transfer function at this time is assumed to be $N_z(s)$, $N_z(s)$ is represented by the following expression (23).

[Expression 23]

$$N_z(s) = \prod_{j=1}^{m}\left(\frac{1}{\omega_{zzj}^2}s^2 + 2\frac{\zeta_{zzj}}{\omega_{zzj}}s + 1\right) \quad (23)$$

The Z-axis zero-point estimation unit 35 outputs information of the zero point, i.e., information of a polynomial expression of the above expression (23) to the response-correction-parameter determination unit 302 by the above operation.

The response-correction-parameter determination unit 302 determines the response correction filter $G_{xrc}(s)$ of the X-axis response correction unit 13 on the basis of the following expression (24), which uses the polynomial expression $N_y(s)$ of the transfer function representing the zero point included in the transfer function $G_{fay}(s)$ from the Y-axis torque command T2 to the Y-axis machine-end displacement signal a2 extracted by the Y-axis zero-point estimation unit 25; a polynomial expression $N_z(s)$ of the transfer function representing the zero point included in the transfer function $G_{faz}(s)$ from the Z-axis torque command T3 to the Z-axis machine-end displacement signal a3 extracted by the Z-axis zero-point estimation unit 35; and the low-pass filter F(s).

[Expression 24]

$$G_{xrc}(s) = F(s) * N_y(s) * N_z \quad (24)$$

F(s) on the right side in the expression (24) is a low-pass filter for making the response correction filter $G_{xrc}(s)$ proper. The low-pass filter F(s) decreases frequency components higher than the control band, of the X-axis position command signal output from the trajectory command generator 301, to reduce an abrupt change and smooth the X-axis position command signal. If the X-axis position command signal is originally generated smoothly, F(s) can be equal to 1.

The response-correction-parameter determination unit 302 determines the response correction filter $G_{yrc}(s)$ of the Y-axis response correction unit 23 on the basis of the following expression (25), which uses the polynomial expression $N_x(s)$ of the transfer function representing the zero point included in the transfer function $G_{fax}(s)$ from the X-axis torque command T1 to the X-axis machine-end displacement signal a1 extracted by the X-axis zero-point estimation unit 15; the polynomial expression $N_z(s)$ of the transfer function representing the zero point included in the transfer function $G_{faz}(s)$ from the Z-axis torque command T3 to the Z-axis machine-end displacement signal a3 extracted by the Z-axis zero-point estimation unit 35; and the low-pass filter F(s).

[Expression 25]

$$G_{yrc}(s) = F(s) * N_x(s) * N_z(s) \quad (25)$$

F(s) on the right side in the expression (25) is the low-pass filter which is the same as in the expression (24) described above.

The response-correction-parameter determination unit 302 determines the response correction filter $G_{zrc}(s)$ of the Z-axis response correction unit 33 on the basis of the following expression (26), which uses the polynomial expression $N_x(s)$ of the transfer function representing the zero point included in the transfer function $G_{fax}(s)$ from the X-axis torque command T1 to the X-axis machine-end displacement signal a1 extracted by the X-axis zero-point estimation unit 15; the polynomial expression $N_y(s)$ of the transfer function representing the zero point included in the transfer function $G_{fay}(s)$ from the Y-axis torque command T2 to the Y-axis machine-end displacement signal a2 extracted by the Y-axis zero-point estimation unit 25; and the low-pass filter F(s).

[Expression 26]

$$G_{zrc}(s) = F(s) * N_x(s) * N_y(s) \quad (26)$$

F(s) on the right side in the expression (26) is the low-pass filter same as in the expression (24) described above.

Also in the present embodiment, similar to the first embodiment, in the X-axis position control unit 11, the Y-axis position control unit 21, and the Z-axis position control unit 31, it means that the delay times with respect to the commands on the X axis, the Y axis, and the Z axis are made identical to set the control parameters of the X-axis position control unit 11, the Y-axis position control unit 21, and the Z-axis position control unit 31, which is described above. This is done such that a response delay from the corrected X-axis position command to the X-axis machine-end displacement signal a1, a response delay from the corrected Y-axis position command to the Y-axis machine-end displacement signal Y-axis machine-end displacement signal a2, and a response delay from the corrected Z-axis position command to the Z-axis machine-end displacement signal a3 are matched with each other.

If there is a zero point in the transfer function from the X-axis torque command T1 to the X-axis machine end position $x_a$, the transfer function from the Y-axis torque command T2 to the Y-axis machine end position $y_a$, and the transfer function from the Z-axis torque command T3 to the Z-axis machine end position $z_a$, then, the relation between the X-axis position command $x_{ref}$ and the X-axis machine end position $x_a$ is represented by the following expression (27); the relation between the Y-axis position command $y_{ref}$ and the Y-axis machine end position $y_a$ is represented by the following expression (28); and the relation between the Z-axis position command $z_{ref}$ and the Z-axis machine end position $z_a$ is represented by the following expression (29).

[Expression 27]
$$x_a(s) = \frac{N_x(s)}{D(s)} F(s) x_{ref}(s) \quad (27)$$

[Expression 28]
$$y_a(s) = \frac{N_y(s)}{D(s)} F(s) y_{ref}(s) \quad (28)$$

[Expression 29]
$$z_a(s) = \frac{N_z(s)}{D(s)} F(s) z_{ref}(s) \quad (29)$$

Therefore, if the characteristics of the zero points on the X axis, the Y axis, and the Z axis are different from each other, i.e., $N_x(s) \ne N_y(s) \ne N_z(s)$, the trajectories by the X-axis machine end position $x_a$ and the Y-axis machine end position $y_a$ become distorted in a command curve by the corrected X-axis position command and the corrected Y-axis position command due to the influence of the zero point. Therefore, correction is required such that even if there is a zero point in the X-axis control target, the Y-axis control target, and the Z-axis control target, the curve not be distorted. As a method of performing correction described above, the inverse function is not used due to the reason described in the first embodiment. Instead thereof, used is a method of assigning the characteristic $N_y(s)$ of the zero point on the Y axis and the characteristic $N_z(s)$ of the zero point on the Z axis to the response correction filter $G_{xrc}(S)$ of the X-axis response correction unit 13; assigning the characteristic $N_x(s)$ of the zero point on the X axis and the characteristic $N_z(s)$ of the zero point on the Z axis to the response correction filter $G_{yrc}(s)$ of the Y-axis response correction unit 23; and assigning the characteristic $N_x(s)$ of the zero point on the X axis and the characteristic $N_y(s)$ of the zero point on the Y axis to the response correction filter $G_{zrc}(s)$ of the Z-axis response correction unit 33. At this time, the characteristics from the X-axis position command $x_{ref}$ to the X-axis machine end position $x_a$ is represented by the following expression (30); the characteristics from the Y-axis position command $y_{ref}$ to the Y-axis machine end position $y_a$ is represented by the following expression (31); and the characteristics from the Z-axis position command $z_{ref}$ to the Z-axis machine end position $z_a$ is represented by the following expression (32). By matching the transfer characteristics on the X axis, the transfer characteristics on the Y axis, and the transfer characteristics on the Z axis with each other, the influences of the zero points are made identical to each other.

[Expression 30]
$$x_a(s) = \frac{N_x(s)}{D(s)} N_y(s) N_z(s) F(s) x_{ref}(s) \quad (30)$$

[Expression 31]
$$y_a(s) = \frac{N_y(s)}{D(s)} N_x(s) N_z(s) F(s) y_{ref}(s) \quad (31)$$

[Expression 32]
$$z_a(s) = \frac{N_z(s)}{D(s)} N_x(s) N_y(s) F(s) z_{ref}(s) \quad (32)$$

According to the above configuration, the transfer function from the position command signal on the X axis to the load machine position on the X axis; the transfer function from the position command signal on the Y axis to the load machine position on the Y axis; and the transfer function from the position command signal on the Z axis to the load machine position on the Z axis become identical to each other.

Because the motor control device according to the present embodiment operates as described above, transient responses with respect to the command on the X axis, the Y axis, and the Z axis become identical to each other. Therefore, trajectory control without distortion of response can be executed with respect to the command trajectory at a high speed and with high accuracy, while reducing a trajectory-following-error with respect to the command trajectory and vibrations even though a curved trajectory is drawn by a control target having low rigidity.

In the present embodiment, the driving system has a three-axis configuration. However, the driving system is not limited thereto, and can have a multi axes configuration having more than three axes by using the same method.

Fourth Embodiment

Figure 7:
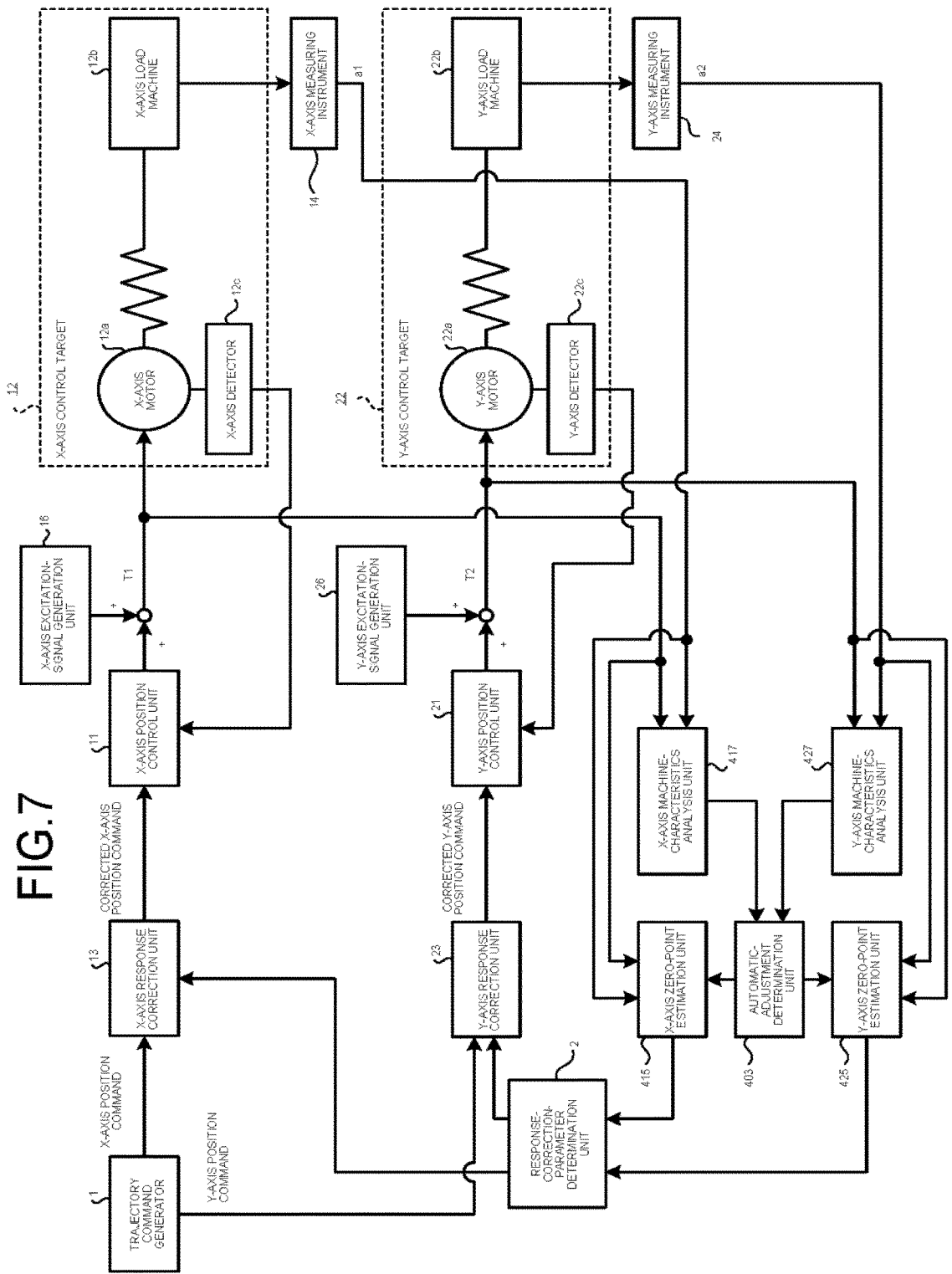
FIG. 7 is a block diagram illustrating a configuration of a motor control device according to a fourth embodiment.

FIG. 7 is a block diagram illustrating a configuration of a motor control device according to a fourth embodiment of the present invention. In the fourth embodiment, blocks denoted with reference signs identical to those of the first embodiment illustrated in FIG. 1 have functions equivalent to those of the first embodiment, and redundant descriptions of the configurations and operations thereof will be omitted. As illustrated in FIG. 7, the motor control device according to the fourth embodiment has a configuration in which an X-axis machine-characteristics analysis unit 417, a Y-axis machine-characteristics analysis unit 427, and an automatic-adjustment determination unit 403 are added to the motor control device according to the first embodiment.

The X-axis machine-characteristics analysis unit 417 performs conversion from a time domain to a frequency domain by using the X-axis torque command T1 at the time of generating the excitation signal by the X-axis excitation-signal generation unit 16 and the X-axis machine-end displacement signal a1 detected by the X-axis measuring instrument 14 as input and output data, and it outputs frequency characteristics on the X axis to the automatic-adjustment determination unit 403.

The Y-axis machine-characteristics analysis unit 427 performs conversion from the time domain to the frequency domain by using the Y-axis torque command T2 at the time of generating the excitation signal by the Y-axis excitation-signal generation unit 26 and the Y-axis machine-end displacement signal a2 detected by the Y-axis measuring instrument 24 as input and output data; and it outputs frequency characteristics on the Y axis to the automatic-adjustment determination unit 403.

The automatic-adjustment determination unit 403 detects the presence of the antiresonant characteristic on the X axis from the frequency characteristics on the X axis output by the X-axis machine-characteristics analysis unit 417; and it outputs the antiresonant characteristic to an X-axis zero-point estimation unit 415, if there is the antiresonant characteristic. Similarly, the automatic-adjustment determination unit 403 detects the presence of the antiresonant characteristic on the Y axis from the frequency characteristics on the Y axis output by the Y-axis machine-characteristics analysis unit 427; and if there is the antiresonant characteristic, it outputs the antiresonant characteristic to a Y-axis zero-point estimation unit 425. Detection of the presence of the antiresonant characteristic is performed by using a moving-average filter to perform a smoothing process and deriving a minimum point from the smoothed frequency characteristics, so that a sketch can be acquired, while reducing fluctuations of minute gain values between adjacent frequencies with regard to the acquired frequency characteristics.

Upon the output of an operation command from the automatic-adjustment determination unit 403, the X-axis zero-point estimation unit 415 performs system identification by using the X-axis torque command T1 at the time of generating the excitation signal by the X-axis excitation-signal generation unit 16 and the X-axis machine-end displacement signal a1 detected by the X-axis measuring instrument 14, which are input and output data; estimates the transfer function $G_{fax}(s)$ from the X-axis torque command T1 to the X-axis machine-end displacement signal a1; and outputs a result of extracting information of the zero point on the X axis, i.e., information of the polynomial expression $N_x(s)$ of the transfer function representing the zero point, to the response-correction-parameter determination unit 2. If the operation command is not output from the automatic-adjustment determination unit 403, the following expression (33) is output to the response-correction-parameter determination unit 2.

[Expression 33]

$$N_x(s)=1 \qquad (33)$$

Upon the output of an operation command from the automatic-adjustment determination unit 403, the Y-axis zero-point estimation unit 425 performs system identification by using the Y-axis torque command T2 at the time of generating the excitation signal by the Y-axis excitation-signal generation unit 26 and the Y-axis machine-end displacement signal a2 detected by the Y-axis measuring instrument 24, which are input and output data; estimates the transfer function $G_{fay}(s)$ from the Y-axis torque command T2 to the Y-axis machine-end displacement signal a2; and outputs a result of extracting information of the zero point on the Y axis, i.e., information of the polynomial expression $N_y(s)$ of the transfer function representing the zero point, to the response-correction-parameter determination unit 2. If the operation command is not output from the automatic-adjustment determination unit 403, the following expression (34) is output to the response-correction-parameter determination unit 2.

[Expression 34]

$$N_y(s)=1 \qquad (34)$$

By having the above configuration, even if an axis having low rigidity and an axis having high rigidity are present in the control target, appropriate parameter adjustment can be performed by automatically discriminating the axis having low rigidity and the axis having high rigidity. Specifically, if all the axes have high rigidity, the above expressions (33) and (34) are input to the response-correction-parameter determination unit 2. Therefore, if the denominator polynomial of the transfer function from the X-axis position command $x_{ref}$ to the X-axis machine end position $x_a$ is assumed to be D(s), the characteristic from the X-axis position command $x_{ref}$ to the X-axis machine end position $x_a$ is represented by the following expression (35) by using the low-pass filter F(s).

[Expression 35]

$$X_a(s) = \frac{1}{D(s)} F(s) X_{ref}(s) \qquad (35)$$

Similarly, the characteristic from the Y-axis position command $y_{ref}$ to the Y-axis machine end position $y_a$ is represented by the following expression (36).

[Expression 36]

$$Y_a(s) = \frac{1}{D(s)} F(s) Y_{ref}(s) \qquad (36)$$

In this manner, the transfer characteristics on the X axis and the transfer characteristics on the Y axis can be matched with each other. If rigidity of any axis is low, the relation is the same as that of the X axis and the Y axis in the second embodiment, and the transfer characteristics on the X axis and the transfer characteristics on the Y axis can be matched with each other. If rigidity of all the axes is low, the relation is the same as that of the X axis and the Y axis in the first embodiment, and the transfer characteristics on the X axis and the transfer characteristics on the Y axis can be matched with each other.

Because the motor control device according to the present embodiment operates as described above, even if the rigidity degree of each axis is unknown when a curved trajectory is drawn by a control target having an axis with low rigidity and an axis with high rigidity mixed therein, the axis with low rigidity and the axis with high rigidity can be automatically discriminated to perform appropriate parameter adjustment. Further, the transient responses with respect to the command on the X axis and the Y axis become identical to each other. Therefore, trajectory control without distortion of response can be executed with respect to the command trajectory at a high speed and with high accuracy, while reducing a trajectory following error with respect to the command trajectory and vibrations.

In the present embodiment, the driving system has a two-axis configuration. However, the configuration of the driving system is not limited thereto, and can have a multi axes configuration having three or more axes by using the same method.

Fifth Embodiment

Figure 8:
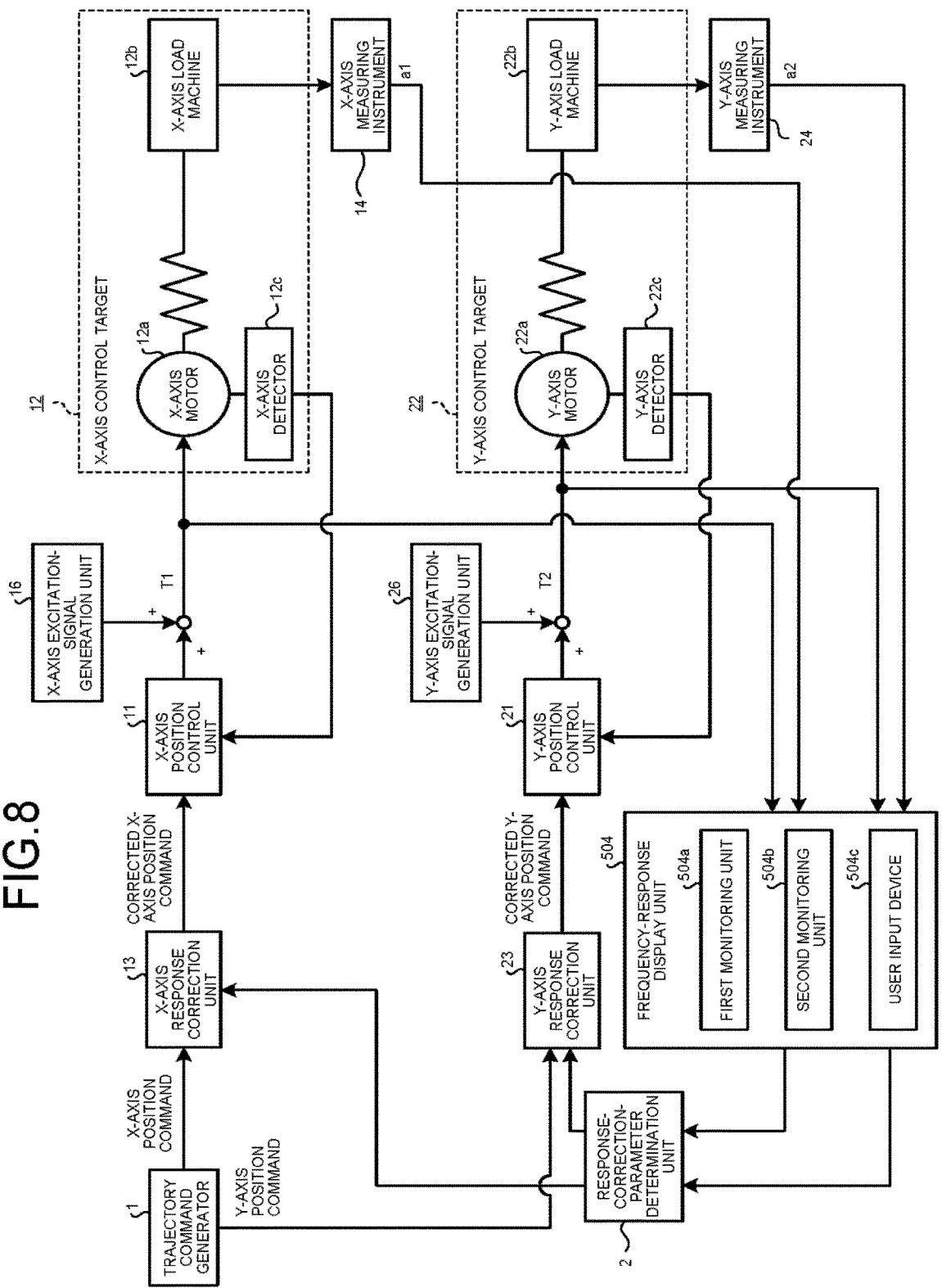
FIG. 8 is a block diagram illustrating a configuration of a motor control device according to a fifth embodiment.
Figure 9:
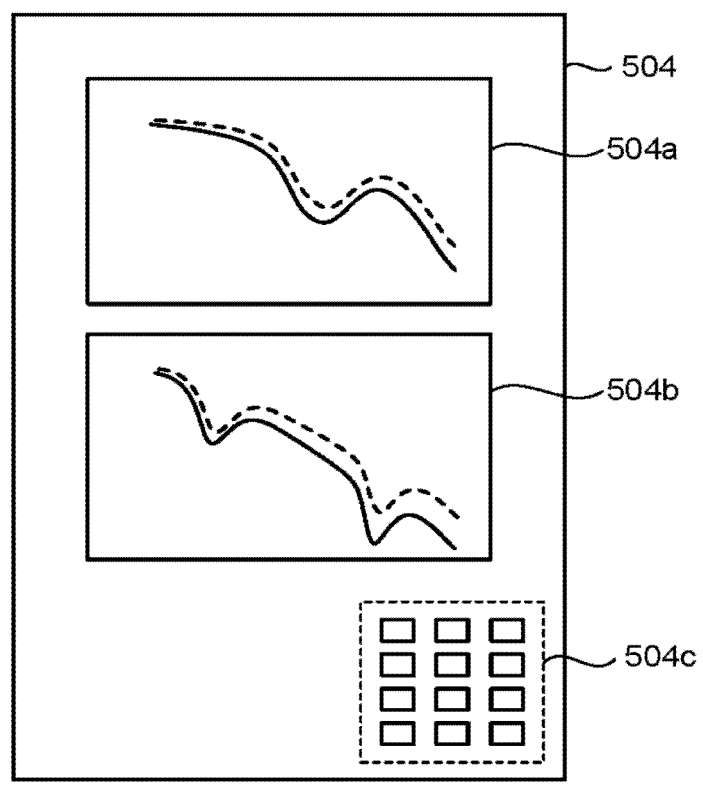
FIG. 9 is a diagram illustrating a frequency-response display unit provided in the configuration of the motor control device according to the fifth embodiment.

FIG. 8 is a block diagram illustrating a configuration of a motor control device according to a fifth embodiment of the present invention. In the fifth embodiment, blocks denoted with reference signs identical to those of the first embodiment illustrated in FIG. 1 have functions equivalent to those of the first embodiment, and redundant descriptions of the configurations and operations thereof will be omitted. As illustrated in FIG. 8, the motor control device according to the present embodiment includes a frequency-response display unit 504 instead of the X-axis zero-point estimation unit 15 and the Y-axis zero-point estimation unit 25 of the motor control device according to the first embodiment. The frequency-response display unit 504 includes a first monitoring unit 504a, a second monitoring unit 504b, and a user input device 504c. FIG. 9 is a diagram illustrating the frequency-response display unit 504 provided in the configuration of the motor control device according to the fifth embodiment of the present invention.

The first monitoring unit 504a performs system identification by using the X-axis torque command T1 at the time of generating the excitation signal by the X-axis excitation-signal generation unit 16 and the X-axis machine-end displacement signal a1 detected by the X-axis measuring instrument 14, which are input and output data, and it displays, on the same graph, a frequency characteristic $F_{rx}$ from the X-axis torque command T1 to the X-axis machine-end displacement signal a1 and a frequency characteristic $F_{fax5}$ of a transfer function $G_{fax5}(s)$ obtained by modeling the frequency characteristic $F_{rx}$ into low dimensional degree model. In FIG. 9, the frequency characteristic $F_{rx}$ is plotted by a solid line, and the frequency characteristic $F_{fax5}$ is plotted by a dotted line.

The second monitoring unit 504b performs system identification by using the Y-axis torque command T2 at the time of generating the excitation signal by the Y-axis excitation-signal generation unit 26 and the Y-axis machine-end displacement signal a2 detected by the Y-axis measuring instrument 24, which are input and output data; and displays, on the same graph, a frequency characteristic $F_{ry}$ from the Y-axis torque command T2 to the Y-axis machine-end displacement signal a2 and a frequency characteristic $F_{fay5}$ of a transfer function $G_{fay5}(s)$ obtained by modeling the frequency characteristic $F_{ry}$ into low dimensional degree model. In FIG. 9, the frequency characteristic $F_{ry}$ is plotted by a solid line, and the frequency characteristic $F_{fay5}$ is plotted by a dotted line.

The user input device 504c has such a configuration that a user can change the parameters of respective transfer functions $G_{fax5}(s)$ and $G_{fay5}(s)$ such that they have low dimensional degrees by a manual operation; can instruct the first monitoring unit 504a to redraw the parameter-changed frequency characteristic $F_{fax5}$; and can instruct the second monitoring unit 504b to redraw the parameter-changed frequency characteristic $F_{fay5}$.

Finally, if the user does not manually perform the parameter change, the user input device 504c outputs results of the transfer functions $G_{fax5}(s)$ and $G_{fay5}(s)$ modeled to have a low dimensional degree, which has been first derived by the first monitoring unit 504a and the second monitoring unit 504b, to the frequency-response display unit 504. If the user manually performs the parameter change, the user input device 504c outputs results of the parameter-changed transfer functions $G_{fax5}(s)$ and $G_{fay5}(s)$ that are modeled to have a low dimensional degree to the frequency-response display unit 504.

The frequency-response display unit 504 outputs the adjustment parameters for the respective axes to the response-correction-parameter determination unit 2 and displays the adjustment parameters thereon on the basis of the results of the transfer functions $G_{fax5}(s)$ and $G_{fay5}(s)$ modeled to have a low dimensional degree output from the user input device 504c. If the user determines that the responsiveness on the X axis needs to be adjusted further, the user input device 504c is operated to adjust the parameter of the transfer function of the low dimensional-degree model $G_{fay5}(s)$ on the Y axis. If the user determines that the responsiveness of the Y axis needs to be adjusted further, the user input device 504c is operated to adjust the parameter of the transfer function of the low dimensional-degree model $G_{fax5}(s)$ on the X axis.

Due to such a configuration, at the time of adjustment of the response correction parameters on the X axis and the Y axis, if a user wishes to add further manual adjustment on the basis of the adjustment parameters on the respective axes derived by the frequency-response display unit 504, the user can perform a setting operation easily, while confirming the change degree of the parameter on a display.

Note that in the present embodiment, the driving system has a two-axis configuration, however, the configuration of the driving system is not limited thereto; can have a multi axes configuration having three or more axes by using the same method; and may have a plurality of monitors corresponding thereto.

As described in the first to fifth embodiments, the motor control device according to the present invention includes a position control unit by means of position feedback for each axis; a zero-point estimation unit that estimates characteristics of a zero point on each axis on the basis of torque commands on the respective axes and a displacement signal of a load machine coupled to a motor; a response-correction-parameter determination unit that calculates respective correction filter on each axis on the basis of the characteristics of the zero point estimated by the zero-point estimation unit; and a response correction unit that inputs a corrected position command converted on the basis of a response correction filter calculated by the response-correction-parameter determination unit to each position control unit. The response-correction-parameter determination unit sets the response correction unit for each axis on the basis of the characteristics of the zero point on each axis acquired by the zero-point estimation unit to set the transfer function from a command to a machine end position identical on each axis. Accordingly, in the motor control device that drives a control target, high acceleration/deceleration driving even with a machine having low rigidity can be realized, and it is feasible to execute trajectory control in which a trajectory drawn by a machine end can follow a command curve without distortion.

INDUSTRIAL APPLICABILITY

As described above, the motor control device according to the present invention is useful as a machine tool and a robot in which a control target is configured by a low-rigidity mechanical system, and is particularly suitable as an NC machine tool and an industrial robot.

REFERENCE SIGNS LIST 1 trajectory command generator, 2 response-correction-parameter determination unit, 11 X-axis position control unit, 12 X-axis control target, 12a X-axis motor, 12b X-axis load machine, 12c X-axis detector, 13 X-axis response correction unit, 14 X-axis measuring instrument, 15 X-axis zero-point estimation unit, 16 X-axis excitation-signal generation unit, 21 Y-axis position control unit, 22 Y-axis control target, 22a Y-axis motor, 22b Y-axis load machine, 22c Y-axis detector, 23 Y-axis response correction unit, 24 Y-axis measuring instrument, 25 Y-axis zero-point estimation unit, 26 Y-axis excitation-signal generation unit, 202 response-correction-parameter determination unit, 212 X-axis control target, 212a X-axis motor, 212b X-axis load machine, 212c X-axis detector, 221 Y-axis position control unit, 301 trajectory command generator, 302 response-correction-parameter determination unit, 31 Z-axis position control unit, 32 Z-axis control target, 32a Z-axis motor, 32b Z-axis load machine, 32c Z-axis detector, 33 Z-axis response correction unit, 34 Z-axis measuring instrument, 35 Z-axis zero-point estimation unit, 36 Z-axis excitation-signal generation unit, 403 automatic-adjustment determination unit, 415 X-axis zero-point estimation unit, 417 X-axis machine-characteristics analysis unit, 425 Y-axis zero-point estimation unit, 427 Y-axis machine-characteristics analysis unit, 504 frequency-response display unit, 504a first monitoring unit, 504b second monitoring unit, 504c user input device, T1 X-axis torque command, T2 Y-axis torque command, T3 Z-axis torque command, a1 X-axis machine-end displacement signal, a2 Y-axis machine-end displacement signal, a3 Z-axis machine-end displacement signal.

The invention claimed is:

1. A motor control device that controls a first motor coupled to a first load machine in a first control target and that controls a second motor coupled to a second load machine in a second control target, the motor control device comprising:
   a first detector to detect a position of the first motor;
   a second detector to detect a position of the second motor;
   a trajectory command generator to output a first position command that is a position command for the first control target and a second position command that is a position command for the second control target;
   a first response corrector to carry out a calculation to apply a first response correction filter to the first position command from the trajectory command generator so as to output a corrected first position command;
   a first position controller to receive the corrected first position command from the first response corrector and a position detected by the first detector so as to generate a first torque command such that the position detected by the first detector matches the corrected first position command;
   a second position controller to receive the second position command from the trajectory command generator and a position detected by the second detector so as to generate a second torque command such that the position detected by the second detector matches the second position command;
   a measuring instrument of the second load machine that detects machine end displacement of the second load machine in the second control target;
   a zero-point estimator of the second control target that extracts information of a polynomial expression of a transfer function representing characteristics of a zero point of a transfer function from the second torque command to the machine end displacement of the second load machine, as characteristics of the zero point of the second control target, on the basis of the second torque command and the machine end displacement of the second control target detected by the measuring instrument of the second load machine or on the basis of the second position command and the machine end displacement of the second control target detected by the measuring instrument of the second load machine; and
   a response-correction-parameter determiner to set the first response correction filter of the first response corrector by using the information of the polynomial expression of the transfer function representing the characteristics of the zero point of the second control target extracted by the zero-point estimator of the second control target, wherein
   the first torque command generated by the first position control unit is input to the first motor, and
   the second torque command generated by the second position control unit is input to the second motor.

2. The motor control device according to claim 1, further comprising:
   a second response corrector
      to carry out a calculation to apply a second response correction filter to the second position command and
      to output a corrected second position command to the second-position control unit;
   a measuring instrument of the first load machine that detects machine-end displacement of the first load machine in the first control target; and
   a zero-point estimator of the first control target
      to extract information of a polynomial expression of a transfer function representing characteristics of a zero point of a transfer function from the first torque command to the machine-end displacement of the first control target, as characteristics of the zero point of the first control target, on the basis of the first torque command and the first machine-end displacement of the first load machine detected by the measuring instrument of the first load machine or on the basis of the first position command and the first machine-end displacement of the first load machine detected by the measuring instrument of the first load machine, wherein
   the response-correction-parameter determiner sets the second response-correction filter of the second response corrector by using the information of the polynomial expression of the transfer function representing the characteristics of the zero point of the first control target extracted by the zero-point estimator of the first control target.

3. The motor control device according to claim 2, further comprising:
   a first-axis excitation-signal generator to generate a first excitation signal to be applied to the first torque command for system identification; and
   a second-axis excitation-signal generator to generate a second excitation signal to be applied to the second torque command for system identification, wherein
   the zero-point estimator of the first control target identifies a transfer function from the first excitation signal to the first machine end displacement by an input signal on the basis of the first excitation signal generated by the first-axis excitation-signal generator and on the basis of the machine end displacement of the first load machine so as to extract the information of the polynomial expression of the transfer function representing characteristics of the zero point of the first control target, and
   the zero-point estimator of the second control target identifies a transfer function from the second excitation signal to the machine end displacement of the second load machine on the basis of an input signal on the basis of the second excitation signal generated by the second-axis excitation-signal generator and on the basis of the machine end displacement of the second load machine so as to extract the information of the polynomial expression of the transfer function representing the characteristics of the zero point of the second control target.

4. The motor control device according to claim 3, further comprising:
   a first machine-characteristics analyzer to obtain first frequency characteristics of the first control target on the basis of the input signal on the basis of the first excitation signal and on the basis of the machine end displacement of the first load machine;

a second machine-characteristics analyzer to obtain second frequency characteristics of the second control target on the basis of the input signal on the basis of the second excitation signal and on the basis of the machine end displacement of the second load machine; and an automatic-adjustment determiner
to search for presence of antiresonant characteristics of the first control target and the second control target respectively on the basis of the first frequency characteristics obtained by the first machine-characteristics analyzer and the second frequency characteristics obtained by the second machine-characteristics analyzer, and
to determine whether to operate the zero-point estimator of the first control target and the zero-point estimator of the second control target, wherein at a time of setting the first response-correction filter and the second response-correction filter,
when the automatic-adjustment determiner operates the zero-point estimator of the first control target, the response-correction-parameter determiner sets the second response-correction filter also by using the antiresonant characteristics of the first control target, and
when the automatic-adjustment determiner operates the second-axis zero-point estimator, the response-correction-parameter determiner sets the first response-correction filter also by using the antiresonant characteristics of the second control target.

5. A motor control device that controls a first motor coupled to a first load machine in a first control target and that controls a second motor coupled to a second load machine in a second control target, the motor control device comprising:
a first detector to detect a position of the first motor;
a second detector to detect a position of the second motor;
a trajectory command generator to output a first position command that is a position command for the first control target and a second position command that is a position command for the second control target;
a first response corrector to carry out a calculation to apply a first response-correction filter to the first position command from the trajectory command generator so as to output a corrected first position command;
a first position controller to receive the corrected first position command from the first response corrector and the position detected by the first detector so as to generate a first torque command such that the position detected by the first detector matches the corrected first position command;
a second response corrector to carry out a calculation to apply a second response-correction filter to the second position command from the trajectory command generator so as to output a corrected second position command;
a second position controller to receive the corrected second position command from the second response corrector and the position detected by the second detector so as to generate a second torque command such that the position detected by the second detector matches the corrected second position command;
a measuring instrument of the first load machine that detects machine end displacement of the first load machine in the first control target;

a measuring instrument of the second load machine that detects machine end displacement of the second load machine in the second control target;
a frequency-response display unit that displays frequency characteristics on the basis of the first torque command and machine end displacement of the first load machine detected by the measuring instrument of the first load machine or on the basis of the first position command and the first machine end displacement of the first load machine detected by the measuring instrument of the first load machine, and on the basis of the second torque command and the machine end displacement of the second load machine detected by the measuring instrument of the second load machine or on the basis of the second position command and the machine end displacement of the second load machine detected by the measuring instrument of the second load machine;
a first monitor of the frequency-response display unit
to calculate first frequency characteristics from the first torque command to the first machine end displacement of the first load machine on the basis of the first torque command and the machine end displacement of the first load machine or on the basis of the first position command and the machine end displacement of the first load machine, and
to display the first frequency characteristics and frequency characteristics of a first simplified model in which the first frequency characteristics are expressed simply by a transfer function;
a second monitor of the frequency-response display unit
to calculate second frequency characteristics from the second torque command to the second machine end displacement of the second load machine on the basis of the second torque command and the machine end displacement of the second load machine or on the basis of the second position command and the machine end displacement of the second load machine, and
to display the second frequency characteristics and frequency characteristics of a second simplified model in which the second frequency characteristics are expressed simply by a transfer function;
a user input device of the frequency-response display unit that performs setting change in a graphical form of the frequency characteristics of the first simplified model displayed on the first monitor of the frequency-response display unit and the frequency characteristics of the second simplified model displayed on the second monitor of the frequency-response display unit; and
a response-correction-parameter determiner to set the first response-correction filter of the first-response corrector and the second response-correction filter of the second-response corrector, by using information of the transfer function of the first simplified model acquired by the first monitor of the frequency-response display unit and information of the transfer function of the second simplified model acquired by the second monitor of the frequency-response display unit.

6. The motor control device according to claim 5, further comprising:
a first-axis excitation-signal generator to generate a first excitation signal to be applied to the first torque command for system identification; and
a second-axis excitation-signal generator to generate a second excitation signal to be applied to the second torque command for system identification, wherein the first monitor
- calculates the first frequency characteristics on the basis of the first torque command at a time of application of the first excitation signal by the first-axis excitation-signal generator and on the basis of the machine end displacement of the first load machine, and
- displays the first frequency characteristics and frequency characteristics of the first simplified model in which the first frequency characteristics are expressed simply by a transfer function, and the second monitor
- calculates the second frequency characteristics on the basis of the second torque command at a time of application of the second excitation signal by the second-axis excitation-signal generator and on the basis of the machine end displacement of the second load machine, and
- displays the second frequency characteristics and the frequency characteristics of the second simplified model in which the second frequency characteristics are expressed simply by a transfer function.

* * * * *